US012708871B2

(12) United States Patent
Ahn et al.

(10) Patent No.: US 12,708,871 B2
(45) Date of Patent: Aug. 18, 2026

(54) METHOD FOR PREPARING HYDROGEN FROM AMMONIA BY USING PRESSURE SWING ADSORPTION

(71) Applicants: POSCO CO., LTD, Pohang-si (KR); RESEARCH INSTITUTE OF INDUSTRIAL SCIENCE & TECHNOLOGY, Pohang-si (KR)

(72) Inventors: Chi-Kyu Ahn, Pohang-si (KR); Chang-Houn Rhee, Pohang-si (KR); Gook-Hee Kim, Pohang-si (KR); Man-Su Lee, Pohang-si (KR); Hai-Woong Park, Ulsan-si (KR); Beom-Sik Kim, Pohang-si (KR); Seong-Min Son, Pohang-si (KR)

(73) Assignees: POSCO CO., LTD, Pohang-si (KR); RESEARCH INSTITUTE OF INDUSTRIAL SCIENCE & TECHNOLOGY, Pohang-si (KR)

( * ) Notice: Subject to any disclaimer, the term of this patent is extended or adjusted under 35 U.S.C. 154(b) by 362 days.

(21) Appl. No.: 18/288,515

(22) PCT Filed: Nov. 10, 2022

(86) PCT No.: PCT/KR2022/017598
§ 371 (c)(1),
(2) Date: Oct. 26, 2023

(87) PCT Pub. No.: WO2023/090752
PCT Pub. Date: May 25, 2023

(65) Prior Publication Data

US 2024/0139669 A1 May 2, 2024

(30) Foreign Application Priority Data

Nov. 17, 2021 (KR) ........................ 10-2021-0158745

(51) Int. Cl.
*C01B 3/04* (2026.01)
*B01D 53/047* (2006.01)
(Continued)

(52) U.S. Cl.
CPC ............ *B01D 53/047* (2013.01); *C01B 3/047* (2013.01); *C01B 3/56* (2013.01);
(Continued)

(58) Field of Classification Search
CPC B01D 53/047; B01D 53/04; B01D 2253/102; B01D 2253/116;
(Continued)

(56) References Cited

U.S. PATENT DOCUMENTS 3,436,352 A * 4/1969 Gardner ................. B01D 53/58 502/417
3,531,246 A * 9/1970 Matsen ................. C01C 1/0458 502/64
(Continued)

FOREIGN PATENT DOCUMENTS

CN 1087319 A 6/1994
CN 1153134 A 7/1997
(Continued)

OTHER PUBLICATIONS

Machine-generated English translation of JP H05-330802 A, published Dec. 14, 1993.*
(Continued)

*Primary Examiner* — Frank M Lawrence, Jr.
(74) *Attorney, Agent, or Firm* — Morgan Lewis & Bockius LLP

(57) ABSTRACT

A method for preparing hydrogen from ammonia by using pressure swing adsorption (PSA) is provided. The method for preparing hydrogen from ammonia, of the present invention, comprises the steps of: generating hydrogen and nitro-
(Continued)

gen from ammonia gas through a high-temperature reaction by using a catalyst; performing purification by selectively adsorbing unreacted ammonia gas from a gas containing unreacted ammonia and low-purity hydrogen and nitrogen, which are supplied through the high-temperature reaction and cooled; and performing purification by separating high-purity hydrogen from the gas consisting of low-purity hydrogen and nitrogen, wherein purification is carried out by using a carbon molecular sieve (CMS) adsorbent so as to desorb the unreacted ammonia gas through PSA.

3 Claims, 7 Drawing Sheets

(51) Int. Cl.
*C01B 3/047* (2026.01)
*C01B 3/56* (2006.01)

(52) U.S. Cl.
CPC .. *B01D 2253/102* (2013.01); *B01D 2253/116* (2013.01); *B01D 2256/16* (2013.01); *B01D 2257/406* (2013.01); *C01B 2203/0277* (2013.01); *C01B 2203/043* (2013.01); *C01B 2203/0465* (2013.01); *C01B 2203/1205* (2013.01)

(58) Field of Classification Search
CPC .......... B01D 2256/16; B01D 2257/406; C01B 3/047; C01B 3/56; C01B 2203/0277; C01B 2203/043; C01B 2203/0465; C01B 2203/1205; C01B 3/04; C01B 2203/042; Y02E 60/36
USPC ............... 95/96, 128, 903; 96/153; 502/416; 423/237, 239.1
See application file for complete search history.

(56) References Cited

U.S. PATENT DOCUMENTS 5,972,834 A 10/1999 Ohsaki et al.
6,261,345 B1 * 7/2001 Miyano .............. B01D 53/0423 95/115
2006/0099123 A1 5/2006 Seeley et al.
2009/0203941 A1 8/2009 Laar et al.
2019/0366260 A1 12/2019 Wang et al.
2020/0156032 A1 5/2020 Fan et al.
2020/0261841 A1 8/2020 Aoki et al.
2022/0119250 A1 * 4/2022 Shin ................... B01D 53/0462

FOREIGN PATENT DOCUMENTS

| | | | |
|---|---|---|---|
| CN | 1153135 | A | 7/1997 |
| CN | 1156974 | A | 8/1997 |
| CN | 112547007 | A | 3/2021 |
| JP | S49128889 | A | 12/1974 |
| JP | S54126689 | A | 10/1979 |
| JP | S59182215 | A | 10/1984 |
| JP | H05-329372 | A | 12/1993 |
| JP | H05-330802 | A | 12/1993 |
| JP | 2009-035458 | A | 2/2009 |
| JP | 2011-146175 | A | 7/2011 |
| JP | 2018-177615 | A | 11/2018 |
| KR | 10-2020-0059972 | A | 5/2020 |
| KR | 10-2247199 | B1 | 5/2021 |

OTHER PUBLICATIONS

Office Action dated Dec. 3, 2024 issued in with corresponding to Japanese Patent Application No. 2023-571617.
Chinese Office Action dated Jun. 13, 2025 issued in Chinese Patent Application No. 202280032837.7 (with English translation).
International Search Report dated Feb. 16, 2023, issued in International Patent Application No. PCT/KR2022/017598 (with English translation).
Mahdi Malmali et al., “Better Absorbents for Ammonia Separation,” ACS Sustainable Chem. Eng, 6(5), 2018.
Gwang Hee Cho et al., “A Study on the Adsorption and Desorption Characteristics of Metal-Impregnated Activated Carbons with Metal Precursors for the Regeneration and Concentration of Ammonia,” Clean Technol., 26(2), 2020, pp. 137-144 (with English Abstract).
Jarkko Helminen et al., “Comparison of Sorbents and Isotherm Models for NH3-Gas Separation by Adsorption,” AIChE Journal, 46(8), 2000.
Extended European Search Report dated Apr. 11, 2025, issued in corresponding European Patent Application No. 22895959.9.

* cited by examiner

METHOD FOR PREPARING HYDROGEN FROM AMMONIA BY USING PRESSURE SWING ADSORPTION

CROSS-REFERENCE OF RELATED APPLICATIONS

This application is the U.S. National Phase under 35 U.S.C. § 371 of International Patent Application No. PCT/KR2022/017598, filed on Nov. 10, 2022, which in turn claims the benefit of Korean Application No. 10-2021-0158745, filed on Nov. 17, 2021, the disclosures of which applications are incorporated by reference herein.

TECHNICAL FIELD

The present disclosure relates to a method for manufacturing hydrogen from ammonia, and more specifically, to a method for manufacturing hydrogen from ammonia that can remove undecomposed ammonia by pressure swing adsorption (PSA) by using a carbon molecular sieve (CMS) adsorbent.

BACKGROUND ART

A conventional ammonia removal processes has been commonly used in an ammonia recovery process to improve the performance of the Haber-Bosch method and an ammonia removal process to prevent emissions into the atmosphere.

A hydrogen production process using ammonia is a process in which ammonia is decomposed into nitrogen and hydrogen by a catalyst under high temperature conditions as illustrated in Reaction 1 below, and depending on a decomposition rate, undecomposed ammonia is included in a decomposition gas ($N_2$, $H_2$) and high-purity hydrogen is produced through a process to remove the same.

$$2NH_3 \rightarrow N_2 + 3H_2 \quad \text{[Reaction 1]}$$

For this purpose, as a conventionally applied process, a temperature swing adsorption (TSA) method has been mainly used, in which ammonia is adsorbed and removed using an adsorbent, and then a temperature of the adsorbent on which adsorption has been completed is raised to perform desorption/regeneration. In the case of this method, issues such as maintaining a temperature inside an adsorption tower uniformly during desorption and cooling the inside of the adsorption tower to prepare for a subsequent adsorption process occurred, so there were various problems that were required to be solved before the method could be used in an actual process.

Accordingly, a pressure swing adsorption (PSA) ammonia adsorption/regeneration process has recently been proposed, and studies are being conducted to confirm feasibility on a laboratory scale at a low concentration level of several thousand ppm. Although there have been laboratory studies to remove low concentrations of ammonia, an ammonia decomposition hydrogen production process has recently been proposed to produce clean hydrogen, and there no examples proposing an adsorbent for the PSA-type ammonia adsorption/desorption process to remove undecomposed ammonia that may occur in this process and the corresponding process.

Generally, a decomposition reaction of ammonia for producing hydrogen is carried out at normal pressure to 9 bar_g. There have been many studies into proceeding with decomposition under pressure for effective operation of a hydrogen purification process. When decomposition is performed in conditions under pressure, an ammonia removal process and a process for purifying hydrogen located at the later stage of the decomposition process can be implemented using the PSA method, which has an advantage of simplifying the process configuration. However, when ammonia is decomposed under pressure, as a decomposition rate of ammonia decreases, undecomposed ammonia remains at a % concentration level, and when undecomposed ammonia is not removed, load on a hydrogen purification facility may increase and finally produced hydrogen is likely to contain ammonia, which can cause problems such as unsatisfactory hydrogen quality.

To this end, previous studies have used various adsorbents to remove ammonia, for example, zeolite, alumina, silica gel, and activated carbon were mainly used (AIChE Journal, 2000, 46(8)), or there were studies using metal halides (MgCl2, CaCl2), SrCl2, MgBr2, CaBr2, SrBr2) to improve adsorption performance (ACS Sustainable Chem. Eng, 2018. 6(5)).

The AIChE Journal has published research conducted on various adsorbents, but only ammonia adsorption data (isothermal adsorption curve) may be used, so there is no additional data on whether it can be applied to a process of removing adsorbed ammonia (regeneration of adsorbent), so it is difficult to determine whether it may be applied using PSA. In particular, in the case of an adsorbent, hysteresis with different aspects of the adsorption and desorption curves is also observed, so it is difficult to determine whether PSA can be applied using only the isothermal adsorption curve. In addition, in ACS Sustainable Chem. In Eng, it was operated at a high temperature (150° C.) and is applied for the temperature swing adsorption (TSA) process, so an operating method, different from the PSA method, was applied.

Meanwhile, there have been some recent studies on adsorbents and adsorbent improvement for pressure swing adsorption (PSA) applications, but the studies were limitedly applied to a relatively low ammonia concentration region (<1000 ppm), and the application of the undecomposed ammonia removal process using the PSA method in a undecomposed ammonia concentration range (% concentration level) that can be produced in the ammonia decomposition hydrogen production process, has not been implemented. In addition, the portion that can be utilized as working capacity according to the ammonia adsorption/desorption cycle is low, making it difficult to determine whether existing studies were aimed at PSA.

PRIOR ART LITERATURE (Patent Document 1) Korean registered patent KR10-2247199B1

SUMMARY OF INVENTION

Technical Problem

Considering that various demands are arising, related to hydrogen production and transportation of hydrogen, to realize a hydrogen-powered society, the present invention focuses on ammonia as a means of transportation and production of hydrogen, which has recently been in the spotlight, and intends to remove undecomposed ammonia in a process of producing hydrogen by decomposing ammonia. Specifically, an aspect of the present invention is to provide a method for manufacturing hydrogen from ammonia that can remove undecomposed ammonia using a pressure swing adsorption (PSA) method, in a process of decomposition of ammonia, removal of undecomposed ammonia, and separation/purification of hydrogen, which are main processes of an ammonia decomposition hydrogen extraction process using a catalyst.

An object of the present disclosure is not limited to the above description. The object of the present disclosure will be understood from the entire content of the present specification, and a person skilled in the art to which the present disclosure pertains will understand an additional object of the present disclosure without difficulty.

Solution to Problem

According to an aspect of the present disclosure, in a method for manufacturing hydrogen from ammonia,

- the method including steps of: generating hydrogen and nitrogen from ammonia gas through a high-temperature reaction by using a catalyst; performing purification by selectively adsorbing undecomposed ammonia gas from a gas containing undecomposed ammonia and low-purity hydrogen and nitrogen, which are supplied through the high-temperature reaction and cooled; and performing purification by separating high-purity hydrogen from the gas consisting of low-purity hydrogen and nitrogen,
- wherein purification is carried out by using a carbon molecular sieve (CMS) adsorbent so as to desorb the undecomposed ammonia gas through PSA.

In the present disclosure, CMS loaded with metal chloride may be used as the adsorbent.

The metal chloride may be one or more selected from $MgCl_2$, $CaCl_2$, $SrCl_2$, $MgBr_2$, $CaBr_2$, and $SrBr_2$.

Advantageous Effects of Invention

As set forth above, according to the present disclosure as described above, by removing undecomposed ammonia by pressure swing adsorption (PSA) using a Carbon Molecular Sieve (CMS) adsorbent, an adsorption amount of ammonia may be improved, and at the same time, desorption performance may be also secured, so that it is useful for removing decomposed ammonia (having a concentration of 0.5 to 11%) generated in a process for ammonia decomposition hydrogen production.

In addition, compared to conventional TSA or scrubbing methods, it consumes less energy and has a simple configuration, so it may be applied to the process for ammonia decomposition hydrogen production. Furthermore, in a process of producing hydrogen from ammonia, the efficiency of the overall hydrogen production process may be improved by effectively desorbing and removing undecomposed ammonia gas and using the same as a heat source in the process for ammonia decomposition hydrogen production.

BEST MODE FOR INVENTION

Hereinafter, the present disclosure will be described.

An aspect of the present disclosure is to provide an adsorbent that can be applied to the method of undecomposed ammonia adsorption/desorption process using a PSA method to supplant the existing TSA, in a process of extracting hydrogen from ammonia through a high temperature and high pressure reaction using a catalyst. Specifically, in the present disclosure, undecomposed ammonia is removed by a PSA method by using carbon molecular sieve (CMS) as the adsorbent, and furthermore, an aspect of the present disclosure is to provide a method of manufacturing hydrogen from ammonia that can improve the adsorption performance of undecomposed ammonia by a PSA method by using CMS loaded with metal chloride such as $MgCl_2$ as the adsorbent.

In a method for manufacturing hydrogen from ammonia by using pressure swing adsorption (PSA), the method including steps of: generating hydrogen and nitrogen from ammonia gas through a high-temperature reaction by using a catalyst; performing purification by selectively adsorbing undecomposed ammonia gas from a gas containing undecomposed ammonia and low-purity hydrogen and nitrogen, which are supplied through the high-temperature reaction and cooled; and performing purification by separating high-purity hydrogen from the gas consisting of low-purity hydrogen and nitrogen, wherein purification is carried out by using a carbon molecular sieve (CMS) adsorbent so as to desorb the undecomposed ammonia gas through PSA.

Figure 1:
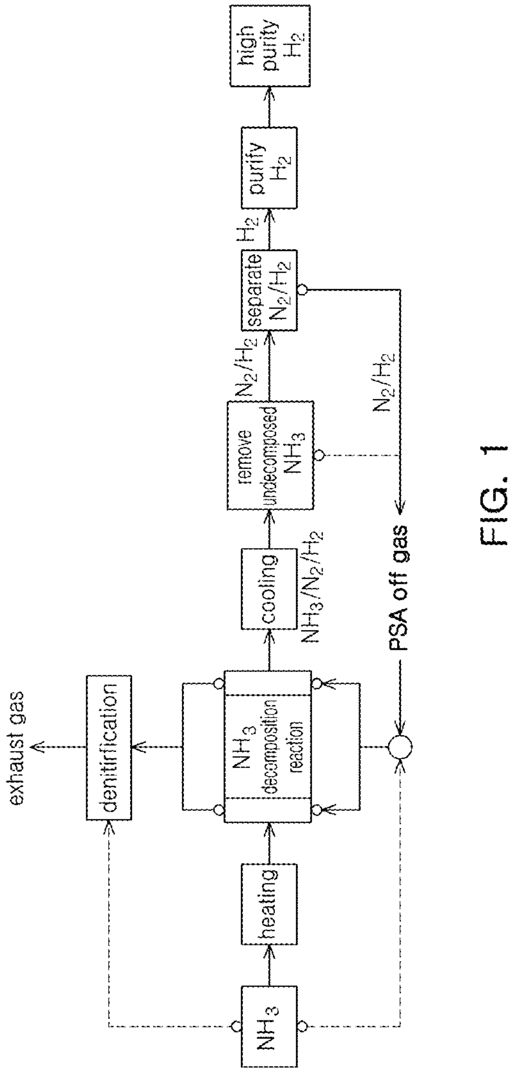
FIG. 1 is a process diagram schematically illustrating a manufacturing process for producing hydrogen from ammonia according to an embodiment of the present disclosure.

FIG. 1 is a process diagram schematically illustrating a manufacturing process for manufacturing hydrogen from ammonia according to an embodiment of the present disclosure.

As illustrated in FIG. 1, generally, a method of extracting hydrogen from ammonia first includes a process of generating hydrogen and nitrogen from ammonia gas through a high temperature reaction using a catalyst.

Generally, ammonia is decomposed into nitrogen and hydrogen through a high-temperature reaction, and a concentration of undecomposed ammonia varies depending on decomposition conditions. Table 1 below illustrates the concentration of undecomposed ammonia according to a decomposition rate of ammonia, a pressure for decomposing ammonia, and a temperature for removing undecomposed ammonia.

As illustrated in Table 1 below, when ammonia is typically decomposed to a 90% level, it can be seen that a level of about 5.3% (53,000 ppm) of ammonia remains. Accordingly, in the present disclosure, considering a level of a conversion rate that can be used in an ammonia decomposition hydrogen extraction process, an adsorbent that can be applied to a pressure swing adsorption (PSA) process under conditions of 0.5 to 11.1% residual ammonia, 40° C., 3 to 9 bar_g, and a method for manufacturing hydrogen using the adsorbent are provided.

TABLE 1

| Conversion rate (%) | $NH_3$ (%) | $N_2$ (%) | $H_2$ (%) | Temperature after cooling(° C.) | Pressure |
|---|---|---|---|---|---|
| 80 | 11.1 | 22.2 | 66.7 | 40 | 3~9 bar_g |
| 90 | 5.3 | 23.7 | 71.1 | 40 | 3~9 bar_g |
| 95 | 2.6 | 24.4 | 73.1 | 40 | 3~9 bar_g |
| 99 | 0.5 | 24.9 | 74.6 | 40 | 3~9 bar_g |

Subsequently, in the present disclosure, purification is performed by selectively adsorbing undecomposed ammonia gas among a gas containing undecomposed ammonia and low-purity hydrogen and nitrogen, which are supplied through the high-temperature reaction process and cooled.

In this case, in the present disclosure, undecomposed ammonia is removed by a PSA (pressure swing adsorption) method using an adsorbent carbon molecular sieve (CMS) as a technology for removing undecomposed ammonia generated in an ammonia decomposition hydrogen production process. By using the CMS as an ammonia adsorption/desorption adsorbent, working capacity for adsorption/desorption of undecomposed ammonia may be secured at a higher level than that of the conventional PSA process.

As process conditions for adsorption and removal of undecomposed ammonia using the CMS of the present disclosure, it is preferable to use undecomposed ammonia gas having an ammonia decomposition rate of 80 to 99%, a concentration of undecomposed ammonia of 0.5 to 11%, pressure of 3 barg to 9 barg, and a temperature of 20 to 50° C.

In addition, preferably, CMS loaded with metal chloride is used as an adsorbent. As a result, better adsorption performance, compared to when CMS, not loaded with metal chloride, is used as an adsorbent, may be shown.

More preferably, at least one selected from $MgCl_2$, $CaCl_2$, $SrCl_2$, $MgBr_2$, $CaBr_2$, and $SrBr_2$ is used as the metal chloride.

Meanwhile, in a working capacity of the ammonia adsorption/removal process using existing activated carbon as an adsorbent, an adsorption amount varies depending on temperature and pressure conditions, but when applied by a TSA method, it is known to have a working capacity of up to 0.6 mmol/g when not pretreated with metal halide and 2.1 mmol/g when treated with $MgCl_2$. However, this process has a problem of making it difficult to process large volumes of gas due to low economic feasibility due to a time required for heating and cooling and a use of additional energy, and increasing greenhouse gas generation due to the use of additional energy. In addition, even when the adsorption/desorption process of undecomposed ammonia was applied using the PSA method using existing activated carbon as an adsorbent, it is known to have a working capacity of up to 0.77 mmol/g in activated carbon when not pretreated with metal halide and 1.57 mmol/g under 9 bar_g conditions when treated with $MgCl_2$ [Study on the adsorption and desorption characteristics of metal-impregnated activated carbon according to metal precursors for regeneration and concentration of ammonia (Clean Technol. 26(2) 2020, 137-144)].

As described above, it can be seen that when the conventional activated carbon is used as an adsorbent, an adsorption capacity is lowered compared to when CMS of the present invention or CMS loaded with metal chloride, which will be described later, is used as an adsorbent.

Subsequently, in the present disclosure, high-purity hydrogen may be produced by separating and purifying high-purity hydrogen from the gas composed of the low-purity hydrogen and nitrogen. Although various methods have been proposed for purifying such high-purity hydrogen, the present invention is not limited to specific process conditions, and various processes may be used without limitations.

MODE FOR INVENTION

Hereinafter, the present invention will be described in detail through examples.

Example

An ammonia adsorption/desorption test was performed using carbon molecular sieve (CMS) in a process for removing undecomposed ammonia. For comparison, an adsorption/desorption test was also performed on CMS loaded with $MgCl_2$ with A to remove undecomposed ammonia. Here, loading of $MgCl_2$ was performed, wherein distilled water containing $MgCl_2$ and CMS are mixed to a level of 4 wt % compared to CMS, and CMS was completely loaded in an $MgCl_2$ solution and then mixed and dried, and subsequently, dried in a nitrogen atmosphere at 200° C. for 1 hour to completely remove residual moisture, additionally, which was used in an ammonia adsorption/desorption experiment.

Figure 2:
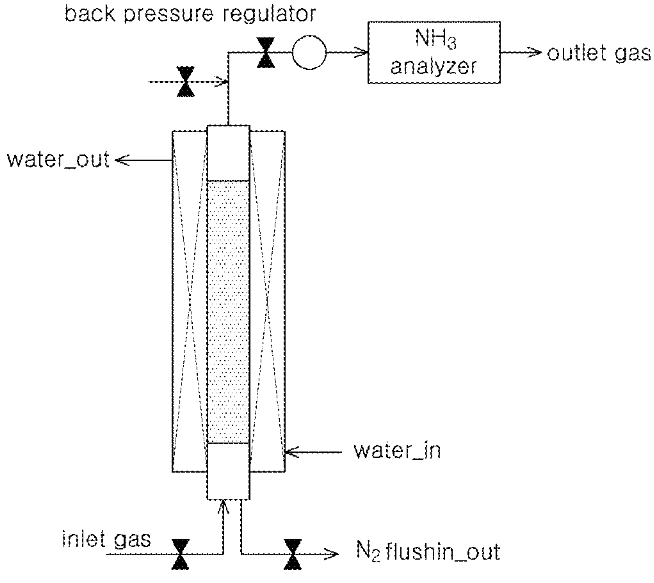
FIG. 2 is a cross-sectional schematic diagram of an ammonia adsorption/desorption test device configured to adsorb, desorb, and remove undecomposed ammonia gas using an adsorbent in an embodiment of the present disclosure.

FIG. 2 is a cross-sectional schematic diagram of an ammonia adsorption/desorption test device configured to adsorb, desorb and remove unreacted ammonia gas using an adsorbent in an embodiment of the present disclosure. As illustrated in FIG. 2, pressure in a reactor containing an adsorbent was controlled through a back pressure regulator to ensure that ammonia was continuously adsorbed to a target pressure, and an ammonia concentration in the gas to which ammonia was adsorbed was continuously analyzed using an ammonia analyzer. When adsorption was completed, a valve of an existing gas line was closed, an $N_2$ flushing line in a lower portion was opened to lower a pressure, and then $N_2$ was supplied to an upper portion to perform a desorption process. When desorption was completed, experimental equipment was configured to supply a gas containing ammonia again to perform adsorption, and the adsorption/desorption performance of the adsorbent when applying the PSA (pressure swing adsorption) process was evaluated.

Meanwhile, in this case, ammonia adsorption/desorption tests were performed under various conditions depending on a temperature, pressure, and ammonia concentration, that may be applied to an ammonia decomposition hydrogen production process, and specific conditions thereof were illustrated in Table 2 below. In this experiment, adsorption was performed under the temperature and pressure conditions illustrated in Table 2 below, and desorption was performed under the same operating conditions or slightly higher than the adsorption temperature, and the adsorbed ammonia was desorbed while flowing nitrogen at normal pressure conditions. Thereafter, after ammonia was completely desorbed, the process of adsorbing/desorbing ammonia was repeated three times under the temperature and pressure conditions illustrated in Table 2 below. The results of the ammonia adsorption/desorption test under these various conditions were also illustrated in Table 2 below.

In addition, FIGS. 3 to 7 illustrate an ammonia adsorption breakthrough curve by cycle when undecomposed ammonia ($NH_3$) gas was adsorbed under each condition.

Figure 3:
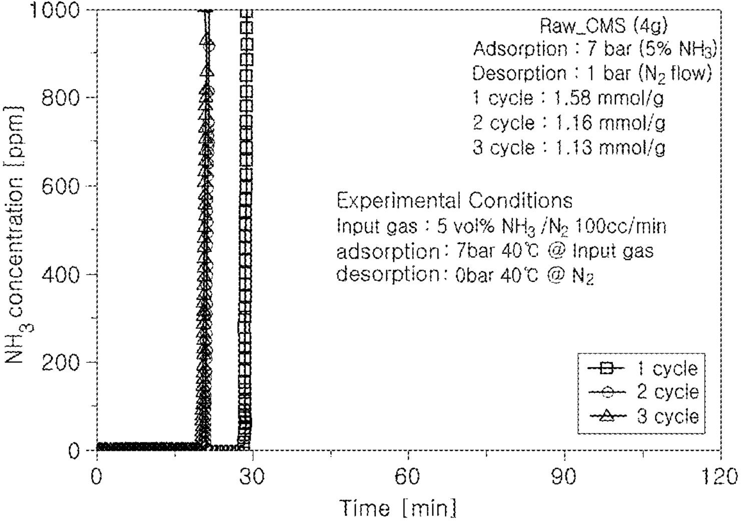
FIG. 3 is a diagram illustrating an ammonia adsorption breakthrough curve by cycle when undecomposed ammonia ($NH_3$) gas having a concentration of 5% was adsorbed at 7 bar pressure using CMS as an adsorbent in an embodiment of the present disclosure.

FIG. 3 is a diagram illustrating an ammonia adsorption breakthrough curve by cycle when undecomposed ammonia ($NH_3$) gas having a concentration of 5% was adsorbed at 7 bar pressure using a CMS as an adsorbent in an embodiment of the present disclosure.

Figure 4:
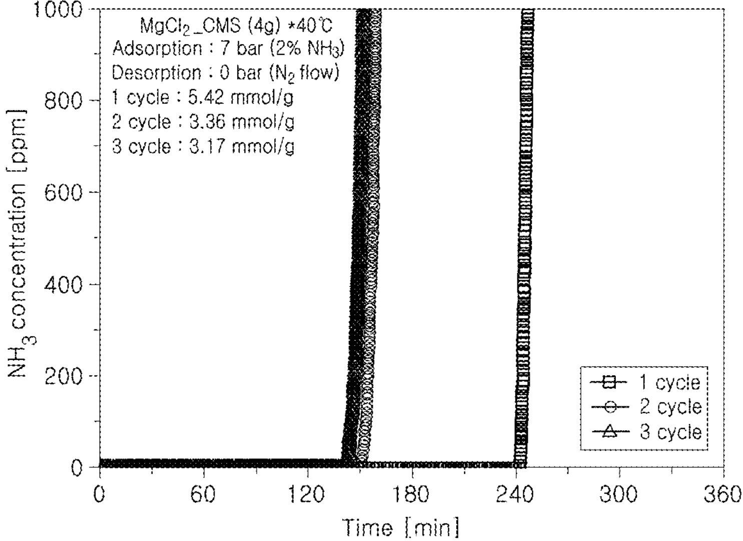
FIG. 4 is a diagram illustrating an ammonia adsorption breakthrough curve by cycle when undecomposed ammonia ($NH_3$) gas having a concentration of 2% was adsorbed at 7 bar pressure using CMS loaded with 4 wt % $MgCl_2$ as an adsorbent in an embodiment of the present disclosure.

FIG. 4 is a diagram illustrating an ammonia adsorption breakthrough curve by cycle when undecomposed ammonia ($NH_3$) gas having a concentration of 2% was adsorbed at 7 bar pressure using a CMS loaded with 4 wt % $MgCl_2$ as an adsorbent in an embodiment of the present disclosure.

Figure 5:
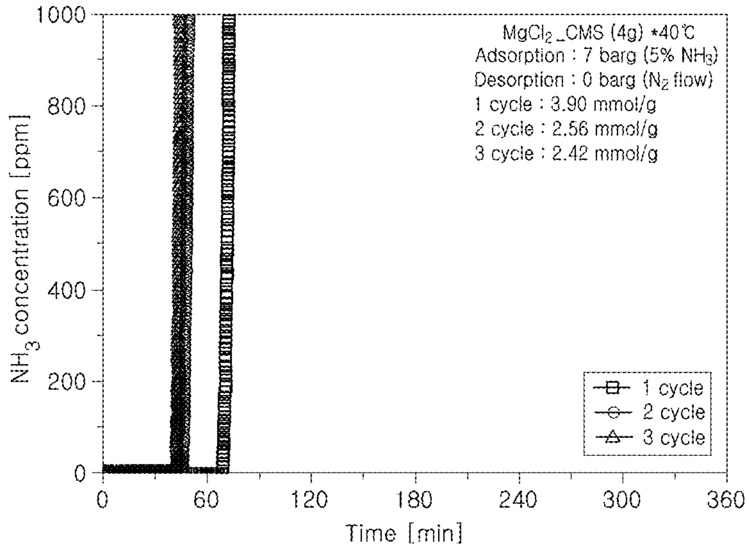
FIG. 5 is diagram illustrating an ammonia adsorption breakthrough curve by cycle when undecomposed ammonia ($NH_3$) gas having a concentration of 5% was adsorbed at 7 bar pressure using CMS loaded with 4 wt % $MgCl_2$ as an adsorbent in an embodiment of the present disclosure.

FIG. 5 is a diagram illustrating an ammonia adsorption breakthrough curve by cycle when undecomposed ammonia ($NH_3$) gas having a concentration of 5% was adsorbed at 7 bar pressure using a CMS loaded with 4 wt % $MgCl_2$ as an adsorbent in an embodiment of the present disclosure.

Figure 6:
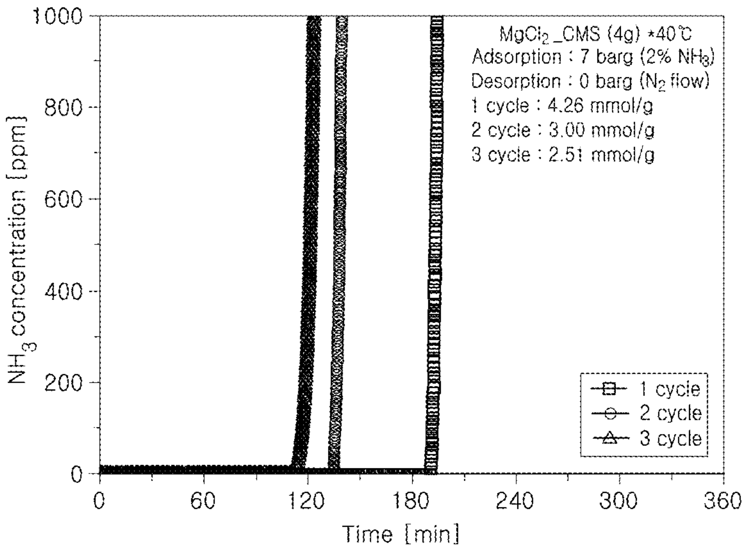
FIG. 6 is diagram illustrating an ammonia adsorption breakthrough curve by cycle when undecomposed ammonia ($NH_3$) gas having a concentration of 2% was adsorbed at 5 bar pressure using CMS loaded with 4 wt % $MgCl_2$ as an adsorbent in an embodiment of the present disclosure.

FIG. 6 is a diagram illustrating an ammonia adsorption breakthrough curve by cycle when undecomposed ammonia ($NH_3$) gas having a concentration of 2% was adsorbed at 5 bar pressure using a CMS loaded with 4 wt % $MgCl_2$ as an adsorbent in an embodiment of the present disclosure.

Figure 7:
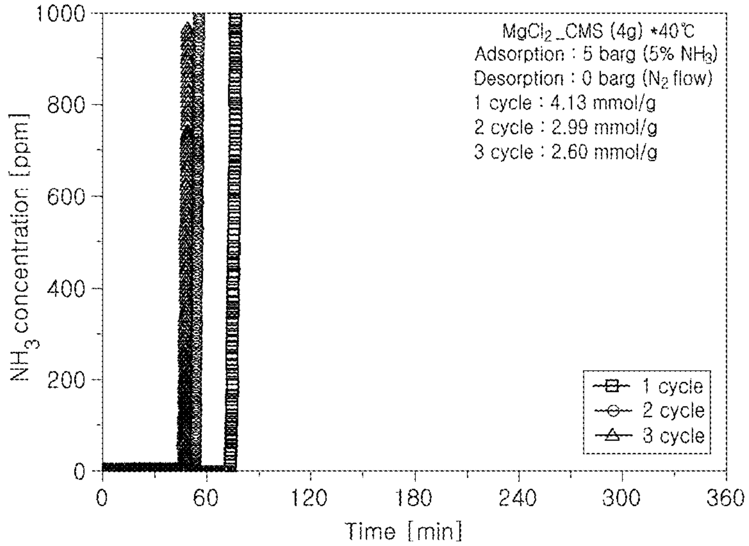
FIG. 7 is diagram illustrating an ammonia adsorption breakthrough curve by cycle when undecomposed ammonia ($NH_3$) gas having a concentration of 5% was adsorbed at 5 bar pressure using CMS loaded with 4 wt % $MgCl_2$ as an adsorbent in an embodiment of the present disclosure.

FIG. 7 is a diagram illustrating an ammonia adsorption breakthrough curve by cycle when undecomposed ammonia ($NH_3$) gas having a concentration of 5% was adsorbed at 5 bar pressure using a CMS loaded with 4 wt % $MgCl_2$ as an adsorbent in an embodiment of the present disclosure.

TABLE 2

| Adsorbent | Virgin CMS | CMS loaded with 4 wt % $MgCl_2$ | | | |
|---|---|---|---|---|---|
| Adsorption pressure | 0.7 MPa | 0.7 MPa | | 0.5 MPa | |
| Temperature | | 40° C. | | | |
| Ammonia concentration | 5% | 2% | 5% | 2% | 5% |
| Adsorption Capacity (mmol/g) | 1.13 | 3.17 | 2.42 | 2.51 | 2.60 |

As illustrated in Table 2 and FIGS. 3 to 7, as a result of measuring an ammonia concentration in a gas having passed through an adsorption column during an adsorption experiment, when ammonia is well adsorbed, it can be seen that almost no ammonia is measured in an exhaust gas.

Typically, when $MgCl_2$ is loaded in existing activated carbon, an adsorption/desorption working capacity was lustrated at a level of 1.4 mmol/g under 7 bar_g conditions, but when CMS, an adsorbent of the present disclosure is used, an adsorption capacity, similar to that of the activated carbon-$MgCl_2$ adsorbent even without loading of $MgCl_2$ could be illustrated. Moreover, when $MgCl_2$ was loaded in CMS, the working capacity was dramatically improved by about 2 times, which was a result, higher than the highest working capacity seen in the existing activated carbon-$MgCl_2$ adsorbent.

Meanwhile, looking at an adsorption curve, it can be seen that the highest level of adsorption amount was illustrated in a first adsorption cycle and the adsorption amount was somewhat decreased in a second, and a third adsorption cycle. This means that an entire amount, adsorbed on an absorbent continues to remain in the adsorbent without being desorbed.

In this case, it is possible to completely remove the adsorbed ammonia when a TSA method is applied, but as described above, it is reasonable to apply a PSA method due to problems that may occur when applying the TSA method. In particular, by operating in the PSA method, it can be effectively used to remove undecomposed ammonia from the gas produced in an ammonia decomposition hydrogen production process while minimizing additional energy consumption.

While example embodiments have been shown and described above, it will be apparent to those skilled in the art that modifications and variations could be made without departing from the scope of the present disclosure as defined by the appended claims.

The invention claimed is:

1. In a method for manufacturing hydrogen from ammonia, the method comprising steps of:

generating hydrogen and nitrogen from ammonia gas through a high-temperature reaction by using a catalyst;

performing primary purification by selectively adsorbing undecomposed ammonia gas from a gas containing undecomposed ammonia and low-purity hydrogen and nitrogen, which are supplied through the high-temperature reaction and cooled; and performing secondary purification by separating high-purity hydrogen from a gas comprising low-purity hydrogen and nitrogen, wherein primary purification is carried out by using a carbon molecular sieve (CMS) adsorbent so as to desorb the undecomposed ammonia gas through PSA, wherein the CMS loaded with metal halide is used as the adsorbent.

2. The method for manufacturing hydrogen from ammonia of claim 1, wherein the metal halide is one or more selected from $MgCl_2$, $CaCl_2$), $SrCl_2$, $MgBr_2$, $CaBr_2$, and $SrBr_2$.

3. The method for manufacturing hydrogen from ammonia of claim 1, wherein the adsorbent is applied to undecomposed ammonia having an ammonia decomposition rate of 80 to 99% by volume %, a concentration of undecomposed ammonia of 0.5 to 11%, pressure of 3 barg to 9 barg, and a temperature of 20 to 50° C.

* * * * *